United States Patent [19]

Silverman

[11] 4,252,209

[45] Feb. 24, 1981

[54] DOWNHOLE LIQUID PRESSURE SEISMIC SOURCE AND BIT POSITIONING SYSTEM

[76] Inventor: Daniel Silverman, 5969 S. Birmingham St., Tulsa, Okla. 74105

[21] Appl. No.: 4,167

[22] Filed: Jan. 17, 1979

Related U.S. Application Data

[63] Continuation-in-part of Ser. No. 792,565, May 2, 1977, Pat. No. 4,144,949.

[51] Int. Cl.³ .......................... G01V 1/40; G01V 1/02
[52] U.S. Cl. ...................................... 181/106; 367/57; 367/40; 175/1; 175/45; 175/234; 166/334
[58] Field of Search .................... 181/102, 106, 112; 367/25, 57, 58, 81; 175/1, 45, 234; 166/334

[56] References Cited

U.S. PATENT DOCUMENTS

| | | | |
|---|---|---|---|
| 2,422,031 | 6/1947 | Merten | 175/232 |
| 2,792,067 | 5/1957 | Peterson | 181/112 |
| 3,876,016 | 4/1975 | Stinson | 367/81 |
| 3,901,333 | 8/1975 | Mori | 166/334 |
| 4,019,592 | 4/1977 | Fox | 166/234 |
| 4,040,003 | 8/1977 | Beynet et al. | 181/106 |

Primary Examiner—Howard A. Birmiel

[57] ABSTRACT

A method of and apparatus for determining the precise position of the drill bit on the bottom of a long drill string in a deep borehole in the earth, during a drilling operation. The method comprises placing a plurality of geophones in a three-dimensional array near the surface of the earth, above the expected position of the drill bit in the earth, causing at least a low energy seismic source to be initiated near the drill bit in the earth, repeating the source a number of times, and determining at the surface of the earth the times of initiation of each of the seismic waves. Responsive to the known times of initiation, stacking each of the repeated geophone signals from each of the geophones, for each of the repetitions of the source, whereby each of the stacked signals will be in-phase with those that resulted from earlier and later repetitions of the source. Several embodiments of an improved downhole seismic source are described, and an improved type of three-dimensional array.

21 Claims, 8 Drawing Figures

DOWNHOLE LIQUID PRESSURE SEISMIC SOURCE AND BIT POSITIONING SYSTEM

CROSS-REFERENCE TO RELATED APPLICATION

This application is a continuation-in-part of my co-pending application, Ser. No. 792,565, filed May 2, 1977, now U.S. Pat. No. 4,144,949 entitled: "Bit Positioning While Drilling System"; which application is entered by reference into this application.

BACKGROUND OF THE INVENTION

This invention is in the field of elastic wave generation and detection in the earth. More particularly, it is concerned with determining the position in the earth of the drilling bit during a drilling operation in a deep borehole.

In the prior art, various means have been devised for determining the position of the borehole in north-south and east-west coordinates, at selected depths during a drilling operation. This has been done by using survey instruments specially designed for introduction through the drill pipe, which by their internal mechanisms make a record of the slope of the borehole at each of a plurality of selected depths, as well as a measure, in relation to the magnetic compass, of the azimuth of the slope of the borehole.

The disadvantage of this particular system is that it requires a stopping of the drilling process so that the drill stem can be broken and the survey instrument inserted on a wire line into the drill pipe. Since the cost of operation of the drill rig runs into many hundreds or thousands of dollars a day, time lost from the drilling operation makes these measurements extremely costly.

More recently several patents have been issued which involve a seismic method of measurement involving the use of a seismic source at or near the bit and detecting the first arrivals of the seismic waves at a plurality of geophones, positioned in a two-dimensional array around the borehole, and determining the position of the source by measurement of travel times of the seismic waves to each of the geophones.

These methods hold some promise, except that they involve the need for a high-energy seismic source at the bit, to provide a useful signal from the geophones. It is extremely difficult to provide large-energy seismic waves without interrupting the drilling process.

SUMMARY OF THE INVENTION

It is a primary object of this invention to provide a simple and inexpensive means for independent determination, at any selected time, of a measurement indicative of the position of the bit, and the bottom of the borehole during a drilling operation.

It is a further object of this invention to provide a method of determining the position of the bottom of the borehole without interrupting the drilling operation.

It is a still further object of this invention to provide a continuing operation, whereby the position of the bit can be determined at a plurality of selected depths, spaced a selected number of feet apart in depth, whereby a continuous log of the bit position, with time, is obtained.

It is a still further object of this invention to provide an apparatus and method for generating a low energy seismic signal at a point near the bottom of a deep borehole, to provide a seismic signal which is a direct function of the vertical position of the drill pipe in the hole.

Still more particularly the object is to provide a drill string, including a spline near the bottom thereof, in the borehole, and to provide means responsive to the separation of the two parts of the spline to create the seismic signal. Thus, by keeping the bottom half of the spline firmly on the bottom of the hole by means of drill collars, apparatus can be initiated by lifting the upper part of the drill stem a matter of a few inches and then lowering it again.

These and other objects are realized and the limitations of the prior art are overcome in this invention by generating at least a low energy seismic wave at the bottom of the borehole, at selected intervals of time.

These weak seismic signals are detected at each of a plurality of geophones near the surface of the earth, positioned in at least a two-dimensional, and preferably a three-dimensional array, around the anticipated position of the bit. The geophone signals are digitized and temporarily stored, and then stacked for a great number of repetitions. Because of the weak seismic source and the high level of seismic noise, the signal-to-noise ratio (S/N R) will be very poor, and it is anticipated that a great many repetitions and stacking will be required to obtain a useful signal.

The key to the detection problem lies in the method of summing, or stacking, successive received signals, in synchronism with the previously received signals. This method is often used in conventional seismic prospecting, where repetitions of 10 to 12 times, or so, are common. Such repetitions provide a signal-to-noise improvement proportional to the square root of the number of repetitions. Thus improvements in S/N R of 3 or 4 to 1 can be obtained in normal operations. The repetitions must be done with the source substantially stationary, and all stacked signals travelling by identical paths.

The cost in time and money of having great numbers of repetitions must be weighed in terms of the value of the S/N R improvement. This limits the number of repetitions usually carried out in surface seismic prospecting.

However, in this application to bit location, time is no problem, since the rate of progress of the bit is relatively slow. Thus, an hour or more can be devoted to providing a very precise position indication. If the time of travel of the signal from the bit to the surface is of the order of 2-3 seconds, or more, in one respect the rate of repetition cannot profitably be less than say 5 to 6 seconds, which permits about 700 repetitions per hour. However, since only a short length of trace is required, encompassing a short time, say 100 to 250 milliseconds, repetition rates of 1 second could be used if the signal initiation mechanism will support it. This would permit 3600 repetitions per hour.

Depending on the hardness of the rock, the rate of penetration of the bit may be from 1 foot per hour, to possibly 25-50 ft. per hour; and if several hours are required to obtain sufficient repetitions to overcome the noise, then the position of the bit has been altered during the stacking process, and the successive seismic waves will not all travel by the same path. This introduces additional travel times in the later signals. If stacking is timed by the time of initiation of the seismic waves, then the received signals of later repetitions will be out-of-phase with the signals from earlier repetitions. Thus the stacking will not be sharp and the precision of position determination will be poor.

One of the principal improvements in this method involves, among a number of factors, the measurement of the incremental downward movement of the drill pipe. This is determined from a "starting", or "first" time, such as when a new length of drill pipe is inserted into the drill string.

The stacking is done with a conventional seismic stacker or summer, such as an analog magnetic drum, or a digital disc, or by CCD delay lines, etc. The time of initiation is controlled at the surface, responsive to the summer, and successive repetitions of the seismic signal are started earlier, by a time interval which is a function of the downward movement of the drill pipe. This function can be proportional to the incremental movement, or to some trigonometric function of this movement, taking account of the instantaneous direction of the bottom of the hole determined from earlier measurements. For the most precise measurements, the additional travel times can be calculated for each of the paths to each of the geophones to ensure synchronous stacking even though the successive paths may be different.

By this system of stacking, the stacking or integration time can be very large, up to several hours, thus providing signal-to-noise ratio improvements of 30, 40, or 50 to 1, or more.

It will be clear that this large number of repetitions can only be done if they do not interfere with the drilling, which would be the case for a number of the methods to be discussed. The method does not strictly require that the seismic source be initiated by signal from the surface provided only that a signal up the pipe or by conductor can be received at the surface to control the timing of the stacking.

Analysis of the stacked signals would provide a determination of the position of the bottom of the borehole coincident with the position of the bit at the "starting time". Stacking could be continued even while the pipe is not turning, and the bit is off bottom, such as when "washing" the hole", and so on, providing only that the source could be initiated.

In other words, since the drilling operation is naturally slow, and since the receiving apparatus can be run, more or less, continuously without interrupting drilling, very long integration times are possible. Thus very weak seismic signals can be detected, providing only that the stacking can be synchronized with the times of initiation of the signals, from the ever-changing position of the source, by a knowledge of the continuing movement of the source.

In view of the high multiplicity of repetitions, I prefer to make use of the capability of recovering true signal amplitude of noisy signal information, by digitizing the received signals plus noise to 1 bit, for simplicity of processing, and then using a great many repetitions.

Another improvement of this continuation-in-part application is the construction of and the method of operation of an improved seismic source that can be controlled from the surface.

Still another improvement involves the use of a three-dimensional array of geophones or sensors at the surface, for improvement in signal/noise ratio.

The general method of generating the seismic waves is to provide a valve system containing at least two parts which is installed in the drill stem in ways which are well-known in the industry. In one method, one of the two parts of the valve is lifted with respect to the second part by means of a tension member, or steel cable, inside of the drill pipe reaching to the surface, where it is lifted a selected short distance by means such as a hydraulic cylinder, for example.

Another method is to provide a spline section in the drill stem near the bottom thereof, and attach one part of the valve means to the upper part of the drill stem above the spline and the second part of the valve to the lower part of the drill stem below the spline. Thus by lifting the pipe a matter of a few inches at the surface of the earth, the valve can be operated and the precise time of operation can be determined.

In another embodiment the valve has two parts which rotate with respect to each other. One part is attached to and rotates with the drill stem, and the other part is in the form of an outer sleeve which is rotatable with respect to the drill stem and has means to prevent its rotation while in the hole. Thus, characteristic signals can be generated either by lifting the pipe or lifting the valve with a tension member, or rotating one part of the valve with respect to the other part, or by any combination of these methods.

With respect to the geophone receivers, it is part of this invention to utilize, for at least one receiver, at the surface a vertical array of sensors which are positioned in a shallow borehole drilled from the surface down to a selected depth. The separate sensors are spaced at selected intervals down this borehole, and are independently connected through amplifiers to the recording apparatus. Means are provided for determining the differential time delay between the passage of a seismic wave generated in the borehole below the bottom sensor, as it sequentially passes each of the sensors. As the seismic wave passes upwardly and is intercepted by each of the succeeding sensors, the time delays can be determined. The received signals generated by each of the separate sensors can then be stacked, by time shifting so that each of the received signals are in phase with each other. This type of operation provides very good protection against noise in the earth which is travelling horizontally and provides improved signal-to-noise ratio for signals which are travelling substantially vertically.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
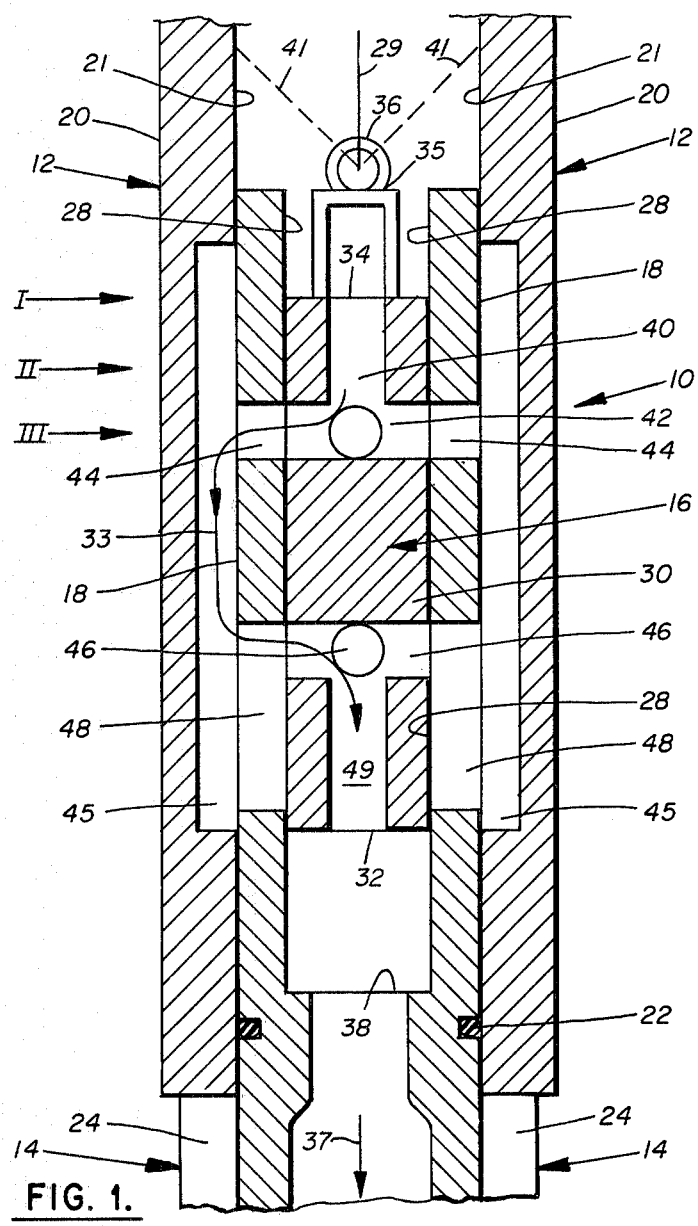
FIG. 1 represents one embodiment of this invention.

Referring now to the drawings, and in particular to FIG. 1, there is shown one embodiment of the invention. This involves a valve system which is inserted into the drill string and which, of course, can be installed in a short sub, so that it can be quickly inserted into or removed from the drill string, as is well known in the art.

The drill stem and valve is indicated generally by the numeral 10 and involves the upper portion of the drill string or drill stem, indicated generally by the numeral 12, which extends from the surface down through the point of assembly of the valve. The lower or continuing portion of the drill string, indicated generally by the numeral 14 includes one or more drill collars if used, and a bit, not shown but well known in the art.

For convenience, the drill string is shown to include a spline, indicated schematically by the numeral 24, which is a well-known construction of drilling equipment, known in the industry. There are two groups of longitudinal fingers which are interrelated with each other. One group is attached to the drill string above the spline, that is, to the part 12, and another set of fingers which is part of the lower drill string indicated by the numeral 14. A vertical sliding motion of the upper drill stem is possible by means of the spline, while still providing torque to the bit and to the lower part of the drill stem.

Normally drilling mud would be flowing down inside of the drill stem 12 and 14 in accordance with the arrow 37 and down through the openings in the bit and up around the outside of the drill stem in the annulus between the drill stem and walls of the borehole, previously cut by the bit.

The purpose of the valve, which will now be described, is to provide a means, operable at the surface, for closing off the flow of mud through the drill stem, so that it will not flow through the bit. When this happens due to the inertia of the long, moving column of mud or water, the water tends to compress and build up pressure at the point of closure, in a phenomena well known as "water hammer". The compression causes a high internal pressure, such that when the valve is again opened after a short interval of time, the compressed water will expand extremely rapidly, and eject water through the valve and down through the openings in the bit. This sudden on-rush of water or mud will cause a compressional elastic wave in the earth, which will then travel upwardly to the seismic detectors at the surface.

Shown in FIG. 1 is a central cylindrical rod of metal, indicated generally by the numeral 16, which is adapted to slide freely, axially, in an opening 28 inside the upper part of the lower drill stem 14. This part is labeled numeral 18. The inner valve, or first part of the valve 16, has an axial opening 40 at the top which joins a plurality of radial openings 42, which extend outwardly to the inner surface 28 of the part 18.

At a certain position there are one or more openings 44 through the wall of the part 18, so that when the inner valve 30 is positioned at the level indicated in the drawing, there will be communication between the space inside of the drill string 12, so that mud or water flowing down the drill string can go through the central opening 40 from the top 34 of the inner valve 30, down through the radial openings 42, and through the openings 44 in the wall of the part 18. The mud will then flow downwardly through the annular space 45, in accordance with arrow 33, through radial openings 48 and 46, and through the central passage 49 and out through the bottom end 32 of the inner valve, and down through the lower drill stem 14 to the bit, in accordance with arrow 37.

Consider that the inner valve 30 has moved downwardly, from the position shown, where the top 34 is at level I, to a second position where the radial openings 42 are completely below the openings 44, and top 34 is at level II. It is clear that the passage from the upper drill stem through the valve is closed off, since the openings 42 are positioned against the solid wall of the part 18. Therefore, the flow of drilling mud through the valve will be cut off and a corresponding "water hammer" pressure will build up in the drill stem above the valve.

Consider now that the inner valve 16 is lowered further so that the top edge 34 is at level III and is below the opening 44 in the part 18. It is clear then that the drilling mud will be able to flow from above the valve over the top edge 34 and out through the openings 44 into the annular passage 45, back through the openings 48, the radial passages 46, and longitudinal passage 49. Thus, the flow of mud is suddenly and explosively reinitiated. This reinitiation will generate the seismic pulse as the expanding water rushes out through the openings in the bit.

The inner valve 16 is now in its lower portion, where the bottom edge 32 can be abutted on the shoulder 38, for example. There is still free passage of mud through the valve and through the bit. Following the same procedure, except by lifting the inner valve 16, will go through the same procedure of closing off the passage for a first selected time until the water hammer pressure builds up to a selected value, and lifting still further, until the passages 42 and 44 are in alignment, where there will be an opening provided for explosively exhausting liquid from above the valve out through the bit.

It is clear therefore that by judicious movement of the inner valve 16 downward a few inches and upward a few inches, the valve can generate a seismic impulse of some magnitude.

The drawing shows a bale 35 on the top of the inner valve, which is supported by a cable 29, which passes upwardly through the inside of the drill stem 12 to the surface. There it can pass outwardly through a stuffing gland so that the valve core 30 can be lifted and lowered by corresponding lifting and lowering of the steel cable 28. This type of construction is illustrated in U.S. Pat. No. 2,370,818 in the name of Daniel Silverman, issued Mar. 6, 1945.

However, if the drill stem has a spline 24 as previously described, then the bale 35 of the inner valve 30 can be attached, by means shown schematically by dashed lines 41, so that it is securely fastened to the inner wall 21 of the upper drill stem 12. In this case, the valve motion, that is, the motion of the inner valve 30 with respect to part 18 and the lower part of the spline 14, can be operated by lifting and lowering the top of the drill stem. Thus, the exact time of the operation can be determined by the times of lifting and lowering the pipe.

In this regard, reference is made to the U.S. Pat. No. 3,817,345 in the name of John R. Bailey issued June 18, 1974, wherein a complete working system was provided for determining the time of operation of a source at the bottom of a drill stem knowing the instant at which the drill pipe was released at the surface, and knowing the length of pipe and the travel time of an elastic wave in the pipe.

What has been described is a valve system which can be operated by steel cable from the surface, or by use of a spline, and lifting the drill stem at the surface by a short distance of the order of inches. Thus, the flow of drilling mud through the drill stem to the bit can be stopped for a selected interval of time, until the water hammer pressure builds up to a selected value. It can then be opened to release that pressure of the compressed water, to create a seismic signal by reinitiating the flow of drilling mud through the bit.

Figure 2:
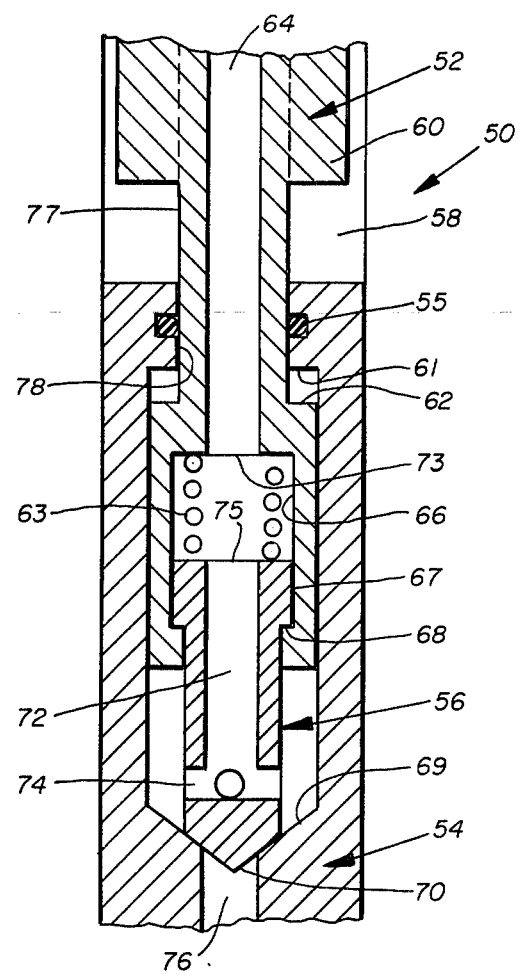
FIG. 2 represents a second embodiment of the invention in which the seismic wave is generated by a valve means which is operated by vertical translation of one part with respect to the other.

Referring now to FIG. 2, there is a second embodiment, of a similar type of valve, in which a spline 58 is provided between an upper drill stem indicated generally by the numeral 52, which has fingers 60, which interleave with corresponding fingers 58, which are attached to the lower drill stem 54, which supports a bit down below. There is a seal 55 between the two parts of the spline, with the upper drill stem passing down into the lower drill stem through the opening 78, and supporting therein a sliding valve element 56.

This central valve 56 is forced downwardly by a helical spring 63, so that it abuts the shoulder 68 and as the upper drill stem 52 is lifted, the inner valve 56 is lifted off the seat 69. This provides an opening from the inside 64 of the upper drill stem 52 down through the central opening 72 of the inner valve, and out through radial openings 74, and out through the opening 76 in the lower drill stem 54. Thus, when the upper drill stem 52 is lifted, there is a free passage for drilling mud through the openings 64, 72, 74, and 76. As the upper drill stem 52 is lowered, the central valve 56 will seat 70 against the valve seat 69, closing off the flow of mud through the drill bit. Then, after a selected interval, the drill stem is raised again to open the valve at the point 69.

If the high pressure in the inside 64 of the upper drill stem 52 is high enough, it may hold the central valve 56 tightly closed against the shoulder 69. In this case, the upper drill stem 52 can be lifted in a jarring fashion, and shoulder 68 can be brought into conjunction, which will provide sufficient momentary upward force to lift the central valve 56, and open the passage so that an explosive expansion of liquid can flow down through 76 and through the bit.

So far, the two embodiments described in terms of FIGS. 1 and 2 have shown valve systems which can be operated either by cable, or by lifting the drill stem and the use of a spline, to momentarily close and then reopen the passage through the drill stem for the mud flow down through the bit. Of course, as in FIG. 1, the inner valve 56 of FIG. 2 can be operated by a cable, etc.

Figure 3:
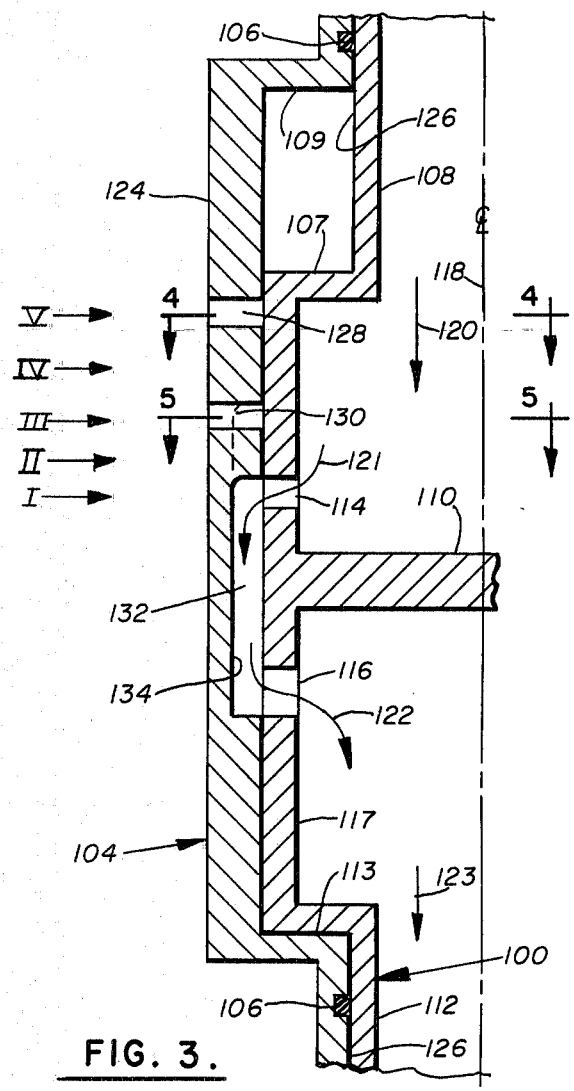
FIG. 3 represents a third embodiment of the invention which involves a valve system that includes rotation of one part of the valve with respect to the other.

Referring now to FIG. 3, there is shown a third embodiment of the invention which involves a rotary type of valve. The drill stem does not require a spline, and the valving is such that at one position of rotation the passage for drilling mud through the drill stem and the bit is closed off and at another position, the flow of drilling mud is reopened, but through the wall of the drill stem to the annulus surrounding the drill stem, rather than through the bit. The opening through the bit is then subsequently reopened, to get back to the starting point. Thus there are three separate positions of the valve—one position in which the valve is closed completely; a second position in which the valve is open to a passage of mud through the drill bit; and a third position where the valve is opened to passage of mud through the wall of the drill stem and out to the annulus.

The situation where this highly compressed "water hammer" is available, and can be released directly from the inside of the drill stem, through the wall of the drill stem, to the annular space, should provide a greater seismic effect than when, as in FIGS. 1 and 2, the compressed liquid is released down through the narrow passages of the drill bit, where the effect of the release of compression is reduced due to further restriction of the flow to the small passageways.

Figure 6:
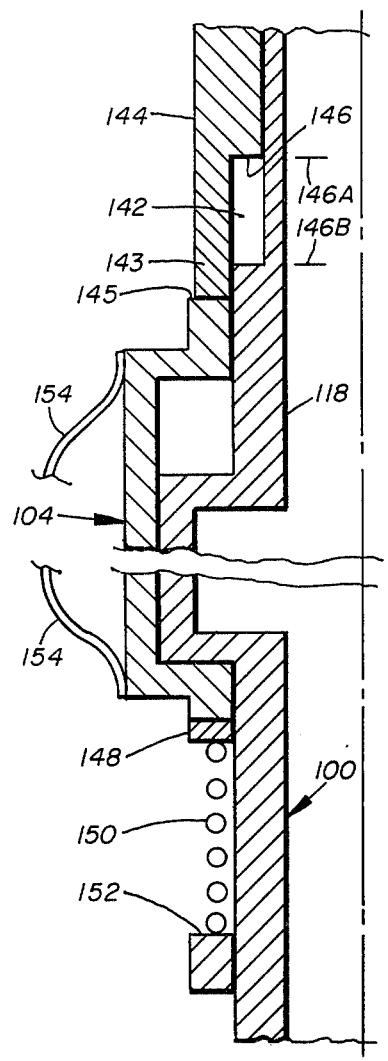
FIG. 6 indicates another embodiment of the invention which involves a valve system which is operable by a combination of lifting and turning.
Figure 5:
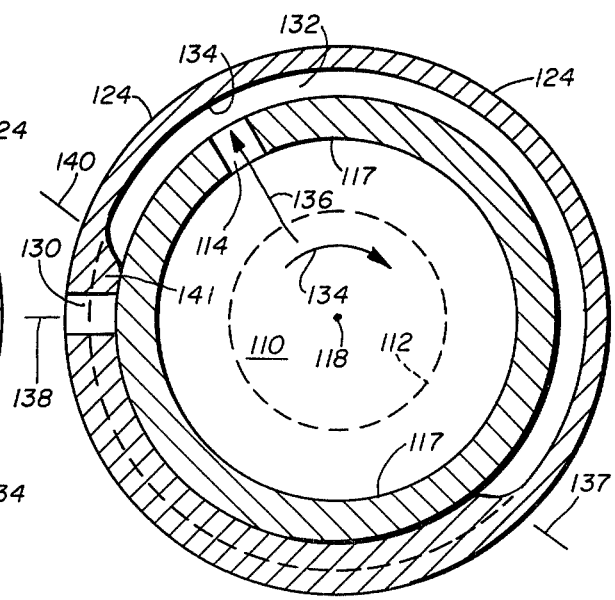

In the prior art there is an instance of a device for creating a seismic impulse in the region of the bit by alternately opening and closing a passage through the wall of the drill stem, while the drilling mud is flowing down through the bit. This is shown in U.S. Pat. No. 4,040,003, entitled "Downhole Seismic Source", issued Aug. 2, 1977. In FIGS. 5, 6 of this patent the openings through the bit are always open, and there is no way that the water hammer effect can be developed. Here, all that the opening through the wall would do, would be to bypass the restriction through the bit, and the resulting pressure drop through the restrictions in the drill bit.

There is no mechanism shown for that device, where there are three valve positions; namely, where there is: A flow through the drill bit, a complete closure of all flow, and then the sudden opening of a flow through the wall of the drill stem. In other words, in the mechanism of FIG. 3, there is a complete shutoff of all flow, and therefore, there is a resultant high value of compression and "water hammer" pressure, which is absent from FIGS. 5 and 6 of U.S. Pat. No. 4,040,003.

In FIG. 3 the drill stem is indicated generally by the numeral 100, and includes an upper portion 108 that continues upwardly to the surface, and has a center line 118. There is a complete transverse bulkhead closure 110 across the inner space of the drill stem. The drill stem continues downwardly with the pipe 112 down to the bit. There is an outer sleeve indicated generally by numeral 104 which surrounds the enlarged portion 117 of the drill stem. This has a relieved annular volume 132. Thus, liquid can flow downward through the drill stem in accordance with arrow 120, then pass out through at least one radial opening 114 into the space 132, which is completely around the sleeve 104, and then back in through an opening 116 in the drill stem in accordance with arrow 122, and then down through the drill stem 123 to the bit. Now, consider that the sleeve 124 is held in position, and the drill pipe 108, 112 is at the position of the opening 114 indicated at level I. The drill pipe is lifted until this opening 114 is above the space 132, and is dead-ended against the inner wall of the sleeve, at the position II. In that case, all flow of liquid is cut off from the space above the bulkhead 110. Therefore, "water hammer" will build up in the drill stem. If the pipe 108 is dropped back to position I, the valve will open through the drill stem and the drill bit. In other words, this valve in FIG. 3, when lifted from position I to position II, creates a shutoff. When it is lowered through the same depth, the valve is opened again. This sort of action is similar to that of FIGS. 1 and 2.

In position III, that is, when the opening 114 is opposite the opening 130 in the sleeve 124, the situation looks like the cross-section in FIG. 5. Here the outer sleeve 124 remains stationary, and the drill stem, indicated by the cross-section of the ring or tube 117, rotates in the direction of the arrow 134. In this position, drilling mud from inside of the upper drill stem, above the bulkhead 110, flows in accordance with arrow 136 into the space 132, and down in accordance with arrow 122, into the drill stem again.

However, when this opening 114 turns another half-turn and approaches the position of the line 137, the opening 114 is closed by the inner wall of the sleeve and during the time the pipe turns between the direction 137 and 138, there is a buildup of water hammer pressure in the upper drill stem. As the opening 114 becomes opposite the opening 130 in the sleeve, there is now a sudden rush of expanding water, explosively flowing out of the opening 130 into the annulus to provide the seimic impulse. Thus, in each revolution, the valve sequentially assumes three positions; namely, its present position in FIG. 5 where the arrow 136 shows flow out through the opening 114 into the annular space 132 and down through the bit; the other position between 137 and 138 where the inner space of the drill stem is completely closed off by the wall of the sleeve; and then the third position during a short interval when this internal pressure is relieved, through the opening 130 in the sleeve.

Thus, the seismic impulse can be generated once each revolution, going through the three separate sequential positions, with the mud flowing through to the bit, the mud stopped, and the pressurized mud released to the annulus, then the opening through the sleeve is closed and the opening through the bit is opened, and the process repeats. By choice of width of the shoulder 141 the opening through the sleeve 130 can be closed before passage is opened through the bit. Or by making this shoulder narrow, the outlet through the bit can be opened before the opening 130 is closed.

Shown in FIG. 3 is a fourth position indicated by level IV where the opening 114 is again closed off, and an upper fifth position at level V, where the opening is again opened to the annulus. Thus by building the sleeve without the opening 130, then a procedure could be carried out whereby with the sleeve and the drill stem in such a relative position indicated by numeral I, the internal volume of the drill stem is open to the bit. Between the positions I and IV, the opening 114 will be closed off by a wall, so that there would be a buildup of water hammer pressure, and then as the opening 114 got to level V, there would be a release of that pressure through the opening 128 out into the annulus.

Thus, by translation alone, it is possible to have a three-position valve, and to go sequentially from one to the other. In one case (lifting the pipe), the buildup pressure would be released to the annulus, and on the down travel of the pipe (or up travel of the sleeve), the second operation of water hammer pressure would be relieved through the drill bit.

Thus, by any selected combinations of rotation of the sleeve 124, or non-rotation of the sleeve and translation of the sleeve, relative to the drill stem, a variety of types of sequential closings and openings can be provided, for generating seismic waves in the earth.

Figure 4:
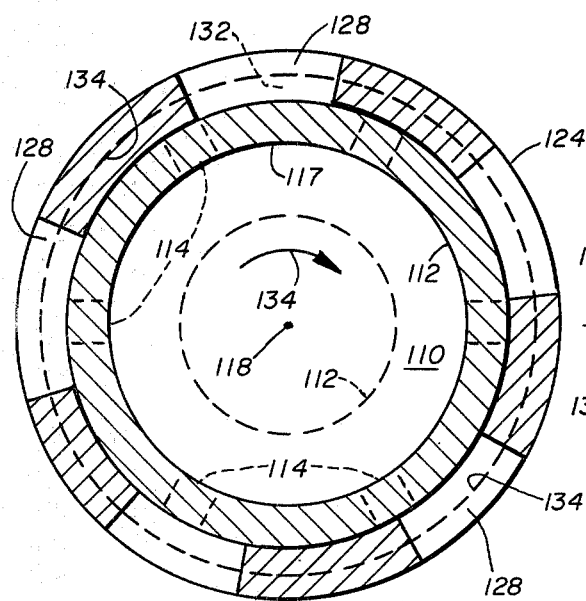
FIGS. 4 and 5 represent cross-sectional views of the apparatus of FIG. 3 taken respectively at planes 4—4 and 5—5.

The position at level V is shown as cross-section, plane 4—4 in FIG. 4. Here a plurality of openings 114 are shown which open into one or another of the enlarged openings 128 in the sleeve. There is always at least one or more openings 114 open to the annulus. Thus, a simple matter of relatively lifting one of the two parts, sleeve or stem, can open the interior of the stem to the annulus. This is a different situation than that shown in FIG. 5 where the rotation of the two parts of the valve provides a sequence of three positions of the valve.

FIG. 6 shows an extension of FIG. 3 in which a spline 142 is provided in the drill stem so that the upper drill stem is 144, the lower drill stem is 100, and the sleeve is held, by such a means as a bow spring 154, to prevent it from rotating. If use were made of the features of FIG. 5, the bow spring would be required so there would be relative rotation between the sleeve 104 and the pipe 100. On the other hand, if the vertical relative motion situation of FIG. 4 is desired, then the bow spring would not be required, and the vertical motion of the sleeve 104 with respect to the drill pipe 100 would be to move it downward by the projecting fingers 143 operating on the top surface 145 of the sleeve. This forces the sleeve down against the pressure of the spring 150, which is locked between a shoulder 152 and the sleeve, with a sliding ring 148 in between. Thus, if a combination of sliding and rotating is required, that is also possible by using the bow spring 154, the spline 142, and lifting and lowering the upper drill stem 144.

Figure 7:
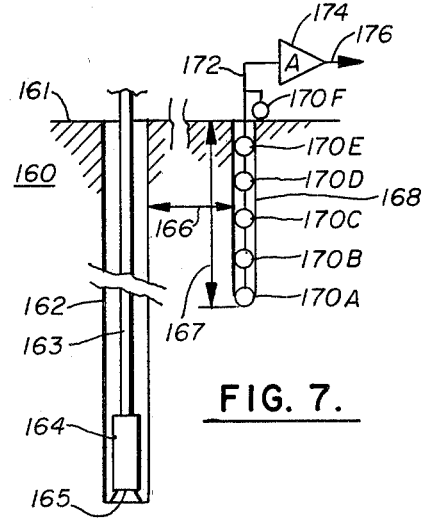
FIGS. 7 and 8 illustrate a portion of the system involving the signal detectors with an improved arrangement of sensors, which provides a higher signal-to-noise ratio.
Figure 8:
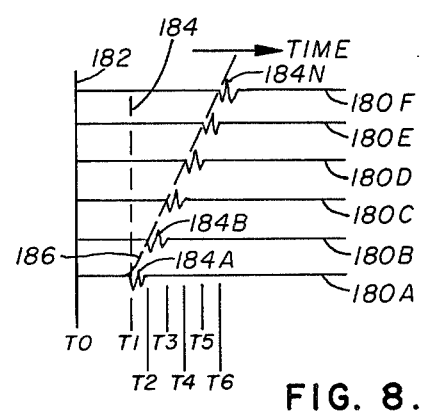

Referring now to FIGS. 7 and 8, there is another feature of this invention in which the geophones that are positioned near the surface of the earth are generally positioned at the surface of the earth. If the seismic signal is a strong one, then that is perfectly adequate. However, there is a great amount of noise in the region of the surface geophones. This is due to the pumps that are operating on the drill rig. Also, the pipe is rotating and rubbing all along its length down the borehole. Thus there will be a lot of seismic noise picked up in the surface geophones which travels more or less horizontally from the drill rig to the geophones.

I have found that there is great advantage in a situation of that sort, instead of providing one or a closely spaced group of several geophones at the surface, of drilling a shallow borehole 168 from the surface 161 down to a selected depth 167 in the earth 160, and positioning it at a selected radius 166 from the principal drilling borehole 162. This radius 166 would be the normal position of one of the geophones. In this shallow borehole 168 I would put a series array of sensors 170A, 170B, 170C, 170D, 170E, 170F, etc. These would be placed at selected spacings, and each of them would be connected through cable 172 to a multi-channel amplifier 174. The signal on 176 from the amplifiers would go to a recorder, as has been discussed in my co-pending application, Ser. No. 792,565.

In the deep borehole 162, there is the drill stem 163, with drill collars 164 and bit 165, which may be many thousands of feet deep. The seismic waves from the source which is near the bottom of the borehole will travel substantially vertically to reach the sensors 170.

In FIG. 8 is a schematic drawing of what a seismic record would look like if these six sensors 170 were recorded on separate traces 180A, 180B, ... 180F.

If the vertical line 182 represents the time T0 at which the source is started, then there would be a time of vertical travel from the bottom of the borehole 162 until the wave front reached the lowermost sensor 170A. At that time, T1 there would be a wavelet 184A representing the time of arrival of the first energy from that seismic source at sensor 170A. A little time later represented by the time T2, wavelet 184B would represent the arrival of the seismic wave at the second sensor 170B, and so on. The wave would arrive at the top sensor 170F, at time T 6, and would look like the wavelet 184N.

The differential time intervals between T1 and T2 would be a function of the vertical spacing between the detectors 170A and 170B, and the velocity of propagation of sound in the earth, in the vicinity of those two sensors. If there was horizontal noise reaching this vertical array of sensors, they would all be received at the same time T1 and the corresponding wavelets would line up along line 184.

If it is vertically travelling energy reaching the sensors 170, their signals 180 would be aligned on a sloping dashed line 186, the slope of which is a function of the velocity of propagation, and the dimensions. Having this information, the separate signals 184A, 184B, etc. can be stacked or added together by introducing time shifts equal to the differential times between T1 and T2, for example, and T1 and T3, so that all of the signals 180 would be added together in the stacking, and an improved signal-to-noise ratio would be derived which would be less sensitive to horizontally travelling energy, which would not represent the signal of interest but would represent noise. Thus, by utilizing the vertical arrays in shallow boreholes as indicated in FIGS. 7 and 8, the signal-to-noise ratio of the detected signals 180 from the weak seismic sources can be improved, and the noise against which the interpretation must be made can be reduced.

If the method of operation of the valve involves the use of an internal cable, some such mechanism as that illustrated in U.S. Pat. No. 2,370,818 can be used, or the equivalent.

If the method of operation of the valve is to lift the drill stem, then a method of operation can be employed in which a rotating arm or cam or a hydraulic cylinder is used to press transversely on the deadline of the hoisting cable from the crown block. Depending on the number of passes of the cable through the crown block, a lengthening of this cable by a foot or so will cause a lifting of the drill stem by several inches.

The preferred operation is to initiate the source at selected intervals different from, and larger than, the period of rotation of the drill stem, and stacking a plurality of repetitive detected signals.

Conversely, it is possible to repeat the source at successively increasing or decreasing time intervals, or in a random time pattern, or other selected time pattern, and then to correlate the received signal with a facsimile of the selected time pattern.

It is possible also to operate as in FIG. 5 with a first selected number of repetitions synchronous with the period of rotation, to provide a group signal pattern, and then to repeat this group pattern at variable selectively longer time intervals, in a selected time pattern, and so on.

Of course, the valve as described in FIG. 1 can be operated by a motor means at the valve, rather than by the cable 28. The motor system is suggested in FIG. 7 of my co-pending application, Ser. No. 792,565. It can be operated by means of conductor carried down inside of the drill stem, such as, for example, shown by U.S. Pat. No. 2,370,818.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. The method of operating a downhole seismic source for use when inside a deep borehole in the earth, using a drill string through which a liquid is circulated downwardly, through the bit, and up through the annulus between the drill string and the borehole; which comprises the steps of;
   (a) rapidly closing the passage through said drill string at a first point above said bit, whereby the flow of liquid through said bit is stopped, and waterhammer pressures will be generated in the liquid in said passage;
   (b) after a first short time interval, rapidly opening a discharge opening from said passage through the wall of said drill string near said first point, while said passage is still closed, for a second short time interval; whereby the compressed liquid in said passage will be explosively vented through said discharge opening; then
   (c) opening said passage through said bit and closing said discharge opening, in any selected order.

2. The method as in claim 1 in which said passage through said bit is opened, before said discharge opening is closed.

3. The method as in claim 1 in which said discharge opening is closed before said passage through said bit is opened.

4. The method as in claim 1 in which said drill string is rotating and said steps (a), (b), (c) are repeated at time intervals which are equal to the period of rotation of said drill string.

5. The method as in claim 1 in which said steps (a), (b), (c) are repeated at selected time intervals which are not equal to the period of rotation of said drill string.

6. The method as in claim 1 in which said steps (a), (b), (c), are repeated at selected varying time intervals according to a selected time pattern.

7. A downhole seismic source for use inside a borehole in the earth including a drill string through which a fluid is circulated down through the drill string, through the bit, and up through the annulus between the drill string and the borehole; which comprises;
   (a) means for rapidly closing the passage through said drill string at a first point above said bit, whereby the flow of fluid through said bit is stopped, and waterhammer pressures will be developed in said passage;
   (b) means for rapidly opening a discharge opening through the wall of said drill string near said first point, a short time interval after the closure of said passage; whereby the compressed liquid in said passage will be explosively vented through said discharge opening into the annulus; and
   (c) means for opening said passage through said bit; and closing said discharge opening in any selected order.

8. The apparatus as in claim 7 in which said source comprises a valve system which includes two principal parts, a first part which translates longitudinally with respect to a second part.

9. The apparatus as in claim 8 in which said first part is moved with respect to said second part by means of a flexible tension means carried up inside said drill string to the surface.

10. The apparatus as in claim 8 including spline means in said drill string near said first point, whereby the upper part of said drill string above said spline means can be lifted with respect to the lower part of said drill string below said spline means; and wherein
 (a) one of said first and second parts is operatively connected to said upper part of said drill string, and
 (b) the other of said first and second parts is operatively connected to said lower part of said drill string.

11. The apparatus as in claim 7 in which said source comprises a valve system which includes two principal parts, a first part which rotates coaxially with respect to a second part.

12. The apparatus as in claim 11 in which said first part rotates with said drill string, and said second part includes sleeve means surrounding said drill string, and adapted to rotate with respect to said drill string.

13. The apparatus as in claim 7 including motor means inside said drill string to operate said source.

14. The apparatus as in claim 7 in which said source comprises a valve system which includes two parts, a first part which can be translated longitudinally with respect to a second part, and can also be rotated coaxially with respect to said second part.

15. A downhole seismic source for use in a borehole in the earth including a drill string through which a liquid is circulated down through the drill string, through the bit, and up through the annulus between the drill string and the borehole, which comprises;
 (a) a spline in said drill string near the lower end thereof, whereby the upper string above said spline can be lifted and lowered a selected short distance with respect to the lower string below said spline;
 (b) valve means inside said string near said spline, said valve means having at least two parts longitudinally movable with respect to each other between at least two vertical positions,
  (1) a first position wherein said valve closes off the flow of said liquid through said drill string to said bit; and
  (2) a second position wherein said valve is open to permit said liquid to flow through said drill string and through said bit;
 (c) means for attaching one part of said valve means to said upper string and a second part of said valve means to said lower string: whereby said valve means can be moved between its at least two position by relatively moving said upper string;
 (d) means to relatively move said upper string rapidly in a direction to close said valve means, whereby waterhammer pressures will be developed in said liquid above said valve means; and
 (e) means to relatively move said upper string in the opposite direction rapidly, after a selected short time interval; whereby said valve means will be opened and the waterhammer pressurized liquid above said valve means will be explosively ejected through said valve means and said bit, to generate a seismic wave in the earth.

16. The apparatus as in claim 15 including at least a third position of said two parts of said valve means, in which the passage through said drill string is opened to said annulus;
 whereby said valve means can be moved between its at least three positions by lifting and lowering said upper string.

17. The apparatus as in claim 15 including;
 (a) means to repeat said source means at selected time intervals a plurality of times;
 (b) a plurality of seismic wave detectors positioned in the earth near the surface, at least in a two-dimensional array, of selected spacing and location with respect to the expected position of the bit; and means to generate received signals in said detectors responsive to the arrival of weak seismic signals at said detectors, to provide a multi-trace set of received electrical signals for each of said repetitions of said source;
 (c) means to determine the times of initiation of said repetition of said source;
 (d) signal stacking means responsive to the determined times of repeated initiation of said source.

18. The apparatus as in claim 17 wherein the number of said plurality of repetitions is at least 100.

19. The apparatus as in claim 17, wherein at least one of said seismic detectors comprises a plurality of seismic sensors spaced vertically from each other at selected spacings, down from the surface to a selected depth, and means to detect the arrival of said seismic signals from said source successively at each of said sensors.

20. A bit positioning system employing the source of claim 16 for determining the position in three dimensions in the earth of the bit, while drilling at the bottom of a deep bore hole, at a first selected instant of time, comprising;
 (a) said source means for generating in the earth near the bit in the bore hole, a low enery seismic signal, and means to repeat said source means at selected time intervals, a selected number of times, to produce a selected number of seismic signals;
 (b) a plurality of seismic wave detectors positioned in the earth near the surface, at least in a two-dimensional array, of selected spacing and location with respect to the expected position of the bit; and means to generate received signals in said detectors responsive to the arrival of said weak seismic signals at said detectors, to provide a multitrace set of received electrical signals for each of said repetitions of said source;
 (c) means to determine the times of initiation of each repetition of said source;
 (d) signal stacking means responsive to the determined times of initiation of each of said selected number of seismic signals, and wherein
 (e) at least one of said seismic wave detectors comprises a plurality of seismic sensors spaced vertically from each other at selected spacings, down from the surface, to a selected depth, and means to detect the arrival of said seismic signals from said source, successively at each of said sensors;
 (f) means to determine the differential time delays between arrival of said seismic signals at each of said sensors; and
 (g) means to stack the signals from said plurality of sensors by time shifting said signals in accordance with said differential time delays.

21. In a downhole seismic source for use in a borehole in the earth including a drill string through which a liquid is circulated down through the drill string, through the bit, and up through the annulus between the drill string and the borehole, which comprises;
 (a) a spline in said drill string near the lower end thereof, whereby the upper string above said spline ca be lifted and lowered a selected distance with respect to the lower string below said spline;

(b) valve means inside said string near said spline, said valve means having at least two parts longitudinally movable with respect to each other between at least two vertical positions,
  (1) a first position wherein said valve closes off the flow of said liquid through said drill string to said bit; and
  (2) a second position wherein said valve is open to permit said liquid to flow through said drill string and through said bit;
(c) means for attaching one part of said valve means to said upper string and a second part of said valve means to said lower string; whereby said valve means can be moved between its at least two positions by relatively lifting and lowering said upper string;

the method of operating said downhole source, comprising (d) relatively moving said upper string rapidly in a direction to close said valve means, whereby waterhammer pressures will be developed in said liquid above said valve means; and
(e) relatively moving said upper string in the opposite direction rapidly, after a selected short time interval, whereby said valve means will be opened and the compressed liquid above said valve means will be explosively ejected through said valve means and said bit, to generate a seismic wave in the earth.

* * * * *